United States Patent Office 3,088,922
Patented May 7, 1963

---

3,088,922
POLYETHERS AND USES OF THE SAME
Roger M. Christenson, Gibsonia, and John J. Jaruzelski, Pittsburgh, Pa., assignors to Pittsburgh Plate Glass Company, Allegheny County, Pa.
No Drawing. Filed Sept. 18, 1956, Ser. No. 610,629
3 Claims. (Cl. 260—2)

This invention relates to a valuable class of ethers and it has particular relation to hydroxylated polyethers and to the reaction thereof with isocyanates to form resins of good chemical and solvent resistance and other valuable properties.

Liquid, soluble polyesters formed by reaction of di- and/or trihydric alcohols and dicarboxylic acids free of ethylenically or acetylenically unsaturation have heretofore been prepared. These polyesters contain linkages of the formula:

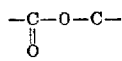

which are formed by esterification reaction between the hydroxyls of the alcohols and the carboxyls of the acids. The polyesters likewise contain some unreacted hydroxyl (—OH) groups in terminal positions and if the alcoholic component comprises three or more hydroxyls, there may also be intermediate hydroxyl groups in the polyester chain. The polyesters may, and usually do, contain some unreacted carboxyl groups.

It has been recognized that polyesters of the foregoing type are adapted to interpolymerize with compounds containing a plurality of isocyanate groups of the structure:

—N=C=O in a reaction involving the unreacted hydroxyls and also unreacted carboxyls (if the latter are present). In the reaction, the isocyanate groups or a part thereof are transformed to provide NH groups in which the hydrogen (H) is reactive with other isocyanate groups, thus producing further branching and interlinking of the molecules.

Water, if present in the system, also takes part in the reaction and in so doing liberates carbon dioxide and produces linkages of the type:

where R is the hydrocarbon portion of a diisocyanate. The participation of available carboxyls in the reaction with the isocyanate groups likewise produces carbon dioxide. Highly cross-linked and latticed, three dimensional polymer molecules are obtained. By proper control of the amount of water in the reaction mixture and by control of other conditions in the reaction, materials are obtained which are useful as coating films or which have highly cellulated sponge-like structure.

The molecular structures of the materials obtained by interaction of isocyanates and polyesters comprise highly complex associations of polyester linkages and amide linkages. The chemistry involved in the several reactions at least in part is disclosed in an article by W. E. Kenline and R. D. Hirschbeck in Plastics Technology, March 1956, pages 168 through 179.

These materials are highly valuable for many purposes and are enjoying many extensive and growing uses in the arts. However, the ester linkages contained therein are characterized by a certain degree of sensitivity to water and they impart to the materials a certain tendency to dissolve in or to imbibe some solvents and likewise to react with some chemicals.

This invention contemplates the provision of hydroxypolyethers comprising alkyl substituted benzene rings which are linked together by alkoxy or ether groups, the molecules of said bodies being terminated by and optionally containing intermediate hydroxyl groups adapted to take part in reactions with compounds containing isocyanate groups in the manner already described.

The polyurethane resins as obtained by the reaction of these materials with compounds containing a plurality of isocyanate groups may be free of ester linkages and are of exceptional resistance to the action of water, solvents and chemicals. Films thereof will adhere to metals and notably to sheet steel to provide highly resistant films.

Hydroxypolyethers of the type contemplated in the practice of the present invention are of the following generalized formula:

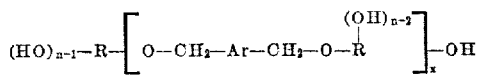

In the formula, the group Ar is arylene, and preferably comprises a single benzene ring, but may also comprise condensed benzene rings as in naphthalene and other groups in which chloromethyl groups may be introduced. It may comprise 1 to 4 alkyl groups such as methyl or ethyl, or alkoxyl groups such as —O—CH, and others, substituted for hydrogen in the aryl nucleus.

In those instances in which Ar is a single benzene ring containing 1 to 4 methyl groups, the formula may be represented as follows:

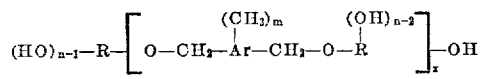

In most instances, the groups R will comprise the residues of a plurality of alcohols. Some will be of polyhydric alcohols as represented by glycerol, pentaerythritol, 1,2,6-hexanetriol, trimethylol propane, etc. containing from 3 to 6 carbons. These are desirable for providing intermediate hydroxyls in the polyether chain. Polyurethane resins from hydroxypolyethers containing them are of improved rigidity and other valuable properties. At least a part of the groups R may be of dihydric alcohols which tend to form long chain molecules. Some or all of the groups R may also be alkoxy as represented by polyethylene glycol, polypropylene glycol, and polybutylene glycol, where there are from about 2 to 50 ethylene, propylene, butylene, or the like groups. The letters $m$, $n$ and $x$ represent numbers which are respectively from 1 to 4; 2 to 6; and 1, or preferably 2, to 50.

In preparing hydroxypolyether compounds of the above indicated structure, various methods may be employed and the invention in its broader aspects is not limited to any particular one of these. However, at the present time a preferred method comprises the reaction in the presence of an alkaline material of a di(halomethyl)substituted benzenoid compound of the type of toluene, xylene, mesitylene, or the like with an alcohol containing a plurality of —OH groups.

By so conducting the reaction very high yields of the desired hydroxy substituted polyether compounds are readily obtained.

Dihalomethyl substituted aromatic compounds of the type of di(chloromethyl)xylenes or di(chloromethyl)-mesitylenes may readily be obtained by the interaction of xylene with aqueous formaldehyde and concentrated hydrochloric acid, with or without catalysts such as zinc chloride. The preparation of 4,6-di(chloromethyl)m-xylene is illustrative and may be conducted as follows:

EXAMPLE A

In accordance with this example, a mixture of 848 grams of m-xylene, 1,700 grams of 37 percent aqueous formaldehyde, 1,200 milliliters of concentrated aqueous hydrochloric acid, and 40 grams of zinc chloride (catalyst) is heated for 20 hours while gaseous hydrochloric acid is bubbled through the mixture. The reaction mixture is then cooled, the crystalline product is filtered, washed thoroughly with water and crystallized once from heptane to obtain yields of 749 grams of 4,6-di(chloromethyl)m-xylene melting in a range of 93° C. to 96° C. This is a generalized reaction in which any one of the other recognized xylenes may be employed or if preferred, mixture of any two may be used. Hydrogen chloride may be replaced by hydrogen bromide or hydrogen iodide. Formaldehyde may be replaced by other aldehydes such as acetaldehyde, propionaldehyde, or the like. The generalized formula of the di(halomethyl)xylene may be represented as follows:

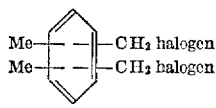

It is to be appreciated that other methyl substituted benzenes such as durene, mesitylene and the like containing up to 4 methyl groups substituted for hydrogen in the benzene ring, may be di-chloromethylated by application of the foregoing techniques. The chloromethylation of mesitylene may be conducted in accordance with the following example:

EXAMPLE B

The reaction mixture comprises 120 grams of mesitylene, 200 grams (2.33 moles) of 37 percent aqueous formalin, 300 milliliters of concentrated hydrochloric acid, and 10 grams of zinc chloride. The mixture is charged into a 3-necked glass flask and is heated at 90° C. while anhydrous hydrogen chloride is bubbled through the same. The reaction is continued for 6 hours after which the reaction mixture is cooled. The solid product is filtered off, washed with water and recrystallized from heptane. The white crystalline product is of the formula:

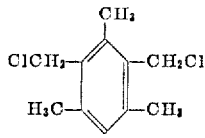

The product has a melting point of 103° C. to 105° C.
Durene of the formula:

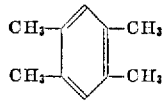

might be substituted for mesitylene or xylene in the chloromethylation reaction.

EXAMPLE C

If desired, chloromethyl derivatives of xylenes of technical grade and comprising mixtures of the several possible xylenes may be employed. The product with or without separation, as by crystallization or by distillation, may be reacted with alcohols containing a plurality of hydroxyls in accordance with the provisions of the present invention in order to provide useful polyethers. The following example illustrates the use of such technical grades of xylene in order to provide mixed chloromethylated xylenes.

The apparatus employed in this example comprises a suitable flask equipped with heating means, thermometer, agitator, reflux condenser and the like. The reaction charge comprises:

| | Grams |
|---|---|
| Hydrochloric acid (37 percent aqueous solution) | 1,620 |
| Xylene (technical grade) | 1,238 |
| Paraformaldehyde (91 percent) | 1,008 |

The heat is applied and the hydrochloric acid current is then turned on and the mixture is held in a temperature range of about 88° C. to 95° C. (e.g. 92° C.) for about 20 hours. During this time a hydrochloric acid gas is bubbled through the mixture at all times at such rate that there is an excess thereof present.

When the specified time has elapsed, the flask contents are allowed to settle in a separatory funnel forming a lower aqueous layer and a yellowish organic layer above it. The aqueous layer is drained off. The aqueous layer comprises 2,315 grams and the organic layer comprises 2,205 grams. The organic layer may, if desired, be purified by crystallization or by distillation to provide chloromethylated xylenes. Analysis of the organic layer showed it comprised:

| | Percent by weight |
|---|---|
| Xylene | 3.7 |
| Monochloromethyl-xylene | 27.1 |
| Dichloromethyl-xylene | 48.7 |
| Glasses and tars | 12 |

The mixture can be separated into its components by fractional distillation or crystallization. However, the latter often is not required since the mixture per se can be reacted with di- or polyhydric alcohols in accordance with the provisions of the present invention to provide useful polyethers.

The chemical reaction involved in converting these dihalomethyl substituted benzene compounds to hydroxypolyethers may be represented by the generalized equation:

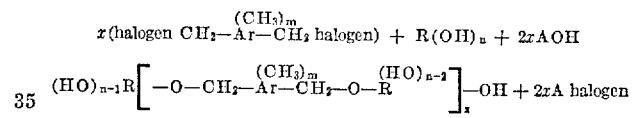

The symbols halogen, R, Ar, $m$, $n$ and $x$ have the meanings previously given. The symbol A denotes an alkali metal such as sodium, potassium, or even an alkaline earth metal such as calcium. In the event that the metal is divalent as in calcium, it will contain two hydroxyl groups. In the reaction as illustrated in which an alkali is employed to promote the reaction, it will be apparent that the various di- and polyhydroxy alcohols already discussed may be employed as the alcoholic component.

Appropriate proportions of the several components of the hydroxypolyethers may be as follows:

| | Moles | |
|---|---|---|
| | From— | To— |
| Dihalomethyl alkyl benzenes | 1 | 1 |
| Dihydric alcohol | 0 | 3.0 |
| Polyalkylene glycol | 0 | 2.5 |
| Polyhydric alcohol | 0 | 6.0 |

The sums of the alcohols preferably will usually approximate 1 mole but may be as high as about 8 moles. Mixtures containing at least about 0.25 mole of one alcohol component while the remainder is one or more moles of the other, are preferred.

The preparation of one polyether resin composition may be conducted as follows:

EXAMPLE I

A three-liter, three-necked glass flask is employed as a reaction vessel. This is equipped with a mechanical stirrer, a Dean-Stark trap for removal of water, a reflux condenser, and a thermometer in well known manner. The flask is charged with 134 grams (1 mole) of 1,2,6-hexanetriol, 90 grams (1 mole) of 1,4-butanediol and the mixture is heated at 70° C. To this warm mixture is added 160 grams (4 moles) of sodium hydroxide pellets. A thick slurry forms and is diluted with 100 milliliters of 1,4-butanediol and 200 milliliters of toluene. The reaction mixture is heated to 90° C. and 406 grams (2 moles) of dichloromethyl-xylene and 600 milliliters of toluene are slowly added. After the addition is completed, the mixture is refluxed for 6 hours. During this time, the calculated amount of water, along with an excess of glycol, are removed from the system. The reaction slurry is diluted with an additional 100 milliliters of toluene, filtered, and the solvent is removed on a steam bath under vacuum in a stream of carbon dioxide. The product was a brownish resin which amounted to 476 grams (a yield of 98.3 percent). The characteristics of the material are as follows:

| | |
|---|---|
| Hydroxyl number | 265.5 |
| Solids (percent) | 98.6 |
| Viscosity (Gardner-Holdt) | $Z_6$ |
| Color (Gardner) | 11–12 |
| pH value | 8 |

The product is a hydroxypolyether of the approximate formula already given. The average molecular weight is approximately 620.

This hydroxypolyether product can successfully be reacted with diisocyanates as hereinafter disclosed in order to form coating compositions or to form foams or cellular products.

EXAMPLE II

In the reaction of this example, the equipment corresponded to that described in Example I. The reactants comprise:

| | |
|---|---|
| Polypropylene glycol (average molecular weight 1025) | 256 grams. |
| 1,4-butanediol | 45 grams (0.5 mole). |
| 1,2,6-hexanetriol | 34 grams (0.25 mole). |
| Sodium hydroxide | 40 grams (1 mole). |

The mixture in the flask is heated until all of the sodium hydroxide dissolves after which 203 grams (1 mole) of dichloromethyl-xylene dissolves in 250 milliliters of toluene were incorporated and the mixture refluxed for 6 hours. An additional 40 grams (1 mole) of sodium hydroxide is added at the conclusion of that period and the heating is continued for an additional 3 hours. The hot reaction mixture is filtered and is purified by vacuum distillation of the volatile materials in a stream of carbon dioxide. The product obtained weighs 429 grams constituting a yield of 91 percent. The analysis of this product is as follows:

| | |
|---|---|
| Hydroxyl number | 54.4 |
| Percent solids | 99.5 |
| Viscosity (Gardner-Holdt) | $Z_5$–$Z_6$ |
| Color (Gardner) | 10–11 |

This product is embraced within the purview of the formula given in Example I. It is a hydroxypolyether well adapted for reaction with a diisocyanate such as a tolylene diisocyanate to form polyurethane resins.

EXAMPLE III

The equipment employed in this example essentially corresponds to that referred to in Example I. The charge initially introduced comprises:

| | |
|---|---|
| Polypropylene glycol (average molecular weight 1025) | 515 grams (0.50 mole). |
| 1,2,6-hexanetriol | 34 grams (0.25 mole). |
| Sodium hydroxide | 40 grams (1 mole). |

In the reaction, the mixture above described is heated and stirred until all of the sodium hydroxide has dissolved, thus forming a slurry which is mixed with 100 grams (0.49 mole) of dichloromethyl-xylene dissolved in 330 milliliters of toluene. The mixture is heated for 4 hours and the reaction is considered complete when the elimination of water ceases. The reaction mixture is diluted with an additional 300 milliliters of toluene, is filtered and the residual solvent is removed under vacuum as above described. A yield of 585 grams (94.5 percent) of a resinous material is thus obtained. This material possesses the following characteristics:

| | |
|---|---|
| Hydroxyl number | 84.7 |
| Viscosity (Gardner-Holdt) | W+ |
| Color (Gardner) | 10–11 |
| Percent solids | 100 |

This product is also a hydroxypolyether suitable for various uses such as coating or for reaction with a diisocyanate such as tolylene diisocyanate in order to form polyurethane resins.

EXAMPLE IV

The reaction vessel is a five-liter, round-bottomed, three-necked flask equipped with a heating device such as an electrical mantle, a water separator, a mechanical stirrer, a reflux condenser, and a thermometer. The flask is charged with the following materials:

| | |
|---|---|
| Polypropylene glycol (average molecular weight 1025) | 51 grams (.05 mole). |
| 1,2,6-hexanetriol | 134 grams (1 mole). |
| 1,4-butanediol | 120 grams (1.33 moles). |
| Toluene (diluent) | 600 milliliters. |

The mixture is heated at 100° C., at which temperature, 176 grams (4.4 moles) of sodium hydroxide in the form of pellets are added. When most of the sodium hydroxide has dissolved, the solution of 447 grams (2.2 moles) of dichloromethyl-xylene in 750 milliliters of toluene is slowly added. When the addition is complete, heating of the mixture is continued for 7 hours. The reaction is considered complete when no more water can be collected in the Dean-Stark trap. The reaction mixture has a pH value of 8 and is treated with 5 milliliters of glacial acetic acid. It is then filtered and the toluene together with other materials is removed under vacuum in a stream of carbon dioxide. The yellowish residue amounts to 528 grams (88.7 percent). This residue constituting the desired product is of the following properties:

| | |
|---|---|
| Hydroxyl number | 179 |
| Percent solids | 99.1 |
| Viscosity (Gardner-Holdt) | $Z_6$+ |
| Color (Gardner) | 8–9 |

This product is a hydroxypolyether which can be reacted with diisocyanates such as tolylene diisocyanate to form a polyurethane resin. It is also suitable for other purposes, for example, as a plasticizer.

EXAMPLE V

The equipment employed in this example substantially corresponds to that of Example IV. The charge employed comprises:

| | |
|---|---|
| 1,4-butanediol | 270 grams (3.0 moles). |
| 1,2,6-hexanetriol | 268 grams (3.0 moles). |
| Polypropylene glycol (average molecular weight 1025) | 153 grams (0.15 mole). |
| Sodium hydroxide | 254 grams (8.85 moles). |
| Toluene (diluent) | 1000 milliliters. |

This mixture in the flask is heated and stirred until the major portion of the sodium hydroxide has dissolved. At this stage, 900 grams (4.43 moles) of dichloromethyl-xylene in 1100 milliliters of toluene is incorporated, the solution being added at such rate as to keep the mixture refluxing at moderate rate. The mixture is heated until the elimination of water completely ceases. The mixture is then filtered and stripped in a stream of inert gas under vacuum. The yellow resinous product remaining amounts to 1140 grams (90 percent). The characteristics of this material are:

Hydroxyl number _____ 188.3
Percent solids _____ 99.3
Viscosity (Gardner-Holdt) _____ $Z_6+$
Color (Gardner) _____ 9–10
Water content (percent) _____ 0.07

EXAMPLE VI

This example illustrates the direct reaction of dichloromethyl-xylene with alcohols containing a plurality of hydroxyls in the absence of alkaline material. The reaction equipment of this example again comprises a five-liter flask equipped with mechanical stirrer, heating mantle, a reflux condenser, thermometer, etc. The reaction charge comprises:

Polyethylene glycol (average
  molecular weight 200) _____ 400 grams (2.0 moles).
Dichloromethyl-xylene _____ 610 grams (3.0 moles).
Trimethylol propane _____ 134 grams (1 mole).

The mixture is heated to 140° C. to 150° C. to start evolution of hydrogen chloride. Heat is applied for 35 hours. At the end of that time, the evolution of hydrochloric acid has diminished to a slight amount. The mixture is diluted with 500 milliliters of xylene and is treated with 75 grams of anhydrous potassium carbonate. It is then heated for an additional 9 hours. A total reaction time of 44 hours is consumed. In a specific example, it was then discontinued and the reaction mixture was filtered and the solvent was removed by distillation under vacuum. A resinous product in an amount of 814 grams was obtained. The properties of the material are as follows:

Hydroxyl number _____ 55.5
Percent solids _____ 95.4
Viscosity (Gardner-Holdt) _____ $Z_4+$
Color (Gardner) _____ 17–18

The residual chlorine content of this material is 7.34. Upon the basis of this chlorine content, the conversion obtained is 60.6 percent. The reaction, in the absence of alkali, is much slower than where the alkali is employed. Also, the conversion is substantially lower. In those instances in which these defects could be tolerated, the process would have utility.

EXAMPLE VII

In this example, a hydroxypolyether is prepared comprising:

|  | Hydroxyl equivalents |
|---|---|
| 1,2,6-hexanetriol | 6 |
| 1,4-butanediol | 6 |
| Polypropylene glycol (average molecular weight 1025) | 0.40 |

This mixture is reacted in the manner described in an amount in which the dichloromethyl-xylene has a chlorine equivalency of 9.50. Sodium hydroxide is employed in the reaction in the manner previously described to obtain improved and more complete reaction. The product is of the following characteristics:

Hydroxyl number _____ 149
Percent solids _____ 99.8
Viscosity (Gardner-Holdt) _____ $Z_6+$
Color (Gardner) _____ 9–10
Yield (percent) _____ 87

This material with isocyanate provides hard, tough films upon surfaces. It can also be reacted with an organic diisocyanate such as tolylene diisocyanate in the presence of water to provide a cellular structure of considerable strength and resistance to compression.

The compositions and properties of a series of hydroxypolyethers prepared in accordance with the provisions of the present invention and substantially by the techniques previously described are tabulated as follows:

| Reactants | DCMX as Cl eq. | Polyol as OH eq. | Cl eq., OH eq. | Hydroxyl eq. | Percent Solids | Gardner-Holdt Viscosity | Gardner Color | Percent Residual Cl | Percent Yield |
|---|---|---|---|---|---|---|---|---|---|
| Hexanetriol 1,2,6 <br> 1,4 Butanediol | 4.0 | 3.0 <br> 2.0 | .80 | 222 | 98.6 | $Z_6-$ | 11–12 | 0.68 | 97.0 |
| 1,2,6-hexanetriol <br> Polypropylene glycol 1025 | 0.98 | 0.75 <br> 1.00 | .56 | 662 | 100 | W+ | 10–11 | 0.65 | 94.5 |
| 1,2,6-hexanetriol <br> 1,4-butanediol <br> Polypropylene glycol 1025 | 1.0 | 0.60 <br> 0.49 <br> 0.60 | .62 | 475 | 100 | W+ | 10–11 | _____ | 88.0 |
| 1,2,6-hexanetriol <br> 1,4-butanediol <br> Polypropylene glycol 1025 | 2.0 | 0.75 <br> 1.00 <br> 0.50 | .89 | 1030 | 99.5 | $Z_5$–$Z_6$ | 10–11 | 0.72 | 91.0 |
| 1,2,6-hexanetriol <br> 1,4-butanediol <br> Polypropylene glycol 1025 | 4.4 | 3.0 <br> 2.66 <br> .05 | .77 | 313 | 99.1 | $Z_6+$ | 8–9 | 1.35 | 91.5 |
| 1,2,6-hexanetriol <br> 1,4-butanediol <br> Polypropylene glycol 1025 | 8.86 | 6.0 <br> 6.0 <br> 0.30 | .72 | 299 | 99.3 | $Z_6+$ | 9–10 | _____ | 90.0 |
| 1,4-butanediol <br> 1,6-hexanetriol <br> Polypropylene glycol 1025 | 7.0 | 4.0 <br> 4.0 <br> 0.2 | .85 | 397 | 95.9 | $Z_2-$ | 8–9 | 3.24 | 96.0 |
| 1,2,6-hexanetriol <br> 1,4-butanediol <br> Polypropylene glycol 1025 | 8.86 | 6.0 <br> 6.0 <br> 0.30 | .72 | 316 | 100 | $Z_6+$ | 9–10 | 1.19 | 96.0 |
| 1,4-butanediol <br> 1,6-hexanediol <br> Polypropylene glycol 1025 | 7.00 | 4.0 <br> 4.0 <br> 0.2 | .85 | 478 | 97.3 | $Z_4+$ | 9–10 | 2.78 | 90.0 |
| Hexanetriol 1,2,6 <br> Butanediol 1,4 <br> Polypropylene glycol 1025 | 9.50 | 6.0 <br> 6.0 <br> 0.40 | .761 | 349 | 99.8 | $Z_6+$ | 9–10 | 0.25 | 87.0 |
| 1,2,6-hexanetriol <br> Trimethylol propane <br> Polypropylene glycol 1025 | 2.50 | 1.50 <br> 1.50 <br> 0.50 | .71 | 768 | 99.6 | $Z_6+$ | Black | _____ | 56.0 |
| 1,2,6-hexanetriol <br> Pentenediol 1,5 <br> Polypropylene glycol 1025 | 4.00 | 2.25 <br> 2.00 <br> 1.00 | .76 | 652 | 99.4 | $Z_4+$ | 10–11 | _____ | 89.0 |
| Trimethylol propane <br> Polyethylene glycol 200 | 6.00 | 3.00 <br> 4.00 | .86 | 515 | 96.1 | $Z_5+$ | 17–18 | 4.74 | 84.5 |
| Trimethylol propane <br> Polyethylene glycol 1025 | 6.00 | 3.00 <br> 4.00 | .86 | 413 | 93.7 | $Z-$ | 9–10 | 10.38 | 94.5 |

In the table, the abbreviation "DCMX" designates dichloromethyl-xylene; the abbreviation "eq." designates equivalents; the number 1025 is the average molecular weight of the polypropylene glycol component, likewise the number 200 is the average molecular weight of the polyethylene glycol employed; the viscosities given are on the Gardner scale.

Each of the above indicated polyethers is reacted with tolylene diisocyanate prepolymer sold commercially under the trade name of "Mondur C." This material is understood to be a prepolymer of 1 mole of tolylene diisocyanate with 1 equivalent of hydroxyl in the form of a polyhydric alcohol, for example 1,2,6-hexanetriol.

Some of the films as thus obtained are tough and hard and of good chemical resistance, others are softer but tough. The variation in characteristics of the films with the composition of the polyether permits the tailoring of the material to meet individual requirements.

The following examples illustrate the preparation of cellular bodies from the hydroxypolyether prepared in accordance with the provision of Example VII.

EXAMPLE VIII

The interpolymerizable composition comprises the following ingredients:

| | |
|---|---|
| Hydroxypolyether prepared as in Example VII grams__ | 50 |
| 1,2,6-hexanetriol _____do____ | 2.5 |
| Hydrogenated dimer acid (these are products of dimerization of higher unsaturated fatty acids such as linseed oil)_____grams__ | 9 |
| Commercial mixture of 2,4 and 2,6-tolylene diisocyanate in the proportions of 80 percent of the former to 20 percent of the latter_____grams__ | 19.45 |
| Diethanolamine (catalyst)_____drops__ | 2 |

The mixture is emulsified with water and is permitted to react for 2 hours at room temperature and is then cured for 2 hours at 240° F. The resultant cellular plastic is of a density of 20.3 pounds per cubic foot and is of a compressive strength of 9,400 p.s.i. and of an impact value of 0.61 foot pounds per inch.

EXAMPLE IX

The interpolymerizable mixture of this example comprises:

| | Grams |
|---|---|
| Hydroxypolyether prepared in accordance with the provisions of Example VII_____ | 50 |
| Hydrogenated dimer acid_____ | 6 |
| 1,2,5-hexanetriol _____ | 2.5 |
| Water _____ | 0.50 |
| Tolylene diisocyanate isomers as in Example VIII__ | 24.8 |

The mixture is cured to provide a cellular product by allowing it to stand for 1½ hours at room temperature and then heating it for 2 hours at a temperature of 230° F. The product is of relatively high density but is of good compressive strength.

EXAMPLE X

The interpolymerizable mixture of this example comprises:

| | |
|---|---|
| Hydroxypolyether as in Example VII____grams__ | 50 |
| 1,2,6-hexanetriol _____do____ | 2.5 |
| Hydrogenated dimer acid_____do____ | 12 |
| Water _____do____ | 2.7 |
| Emulsifier (Tween 20)_____drops__ | 4 |
| Diethanolamine (catalyst)_____do____ | 1 |
| Methylene chloride_____milliliters__ | 20 |
| Tolylene diisocyanate isomers as in Example VIII _____grams__ | 34.5 |

The Tween 20 of the foregoing example is understood to be the polypropylene sorbitan monolaurate. The mixture as above described is allowed to foam and is cured for 60 minutes at 120° F. and for another 60 minutes at 250° F. The product has a relatively uniform cell structure. The density is 4.3 pounds per cubic foot and the compressive strength at 25 percent compression is 50 pounds per square inch. This is a foam of relatively low density.

The use of diethanolamine as a catalyst in the reaction of the hydroxypolyethers and the organic diisocyanates has been described. It will be apparent that other catalysts may be employed in this capacity. Examples of these are N-alkyl morpholines such as methyl morpholine and the N-ethyl morpholines and salts thereof formed by reacting the N-alkyl morpholines with anhydrides of such carboxylic acids as acetic acid. Tertiary amines in general may be employed as catalysts.

Other diisocyanates may be substituted for tolylene diisocyanate. These include:

Chlorophenylene diisocyanate
Ethylene diisocyanate
1,4-tetramethylene diisocyanate
p-Phenylene diisocyanate
p,p'-Diisocyanatodiphenylmethane, and others The organic diisocyanates may be employed in ratios, for example, of about 0.5 to 4 equivalencies of the diisocyanate groups per equivalency of the available hydroxyls in the hydroxypolyethers.

The catalysts may be used in amounts varying from 0.01 to about 10 percent by weight based upon the total mixture.

Wetting agents such as Tween 20 which is polyoxyethylene sorbitan monolaurate alcohol, Tween 40 which is polyoxyethylene sorbitan monopalmitate, Tween 60 which is polyoxyethylene sorbitan monostearate, Triton X 100 which is alkyl aryl polyether alcohol, Triton X 200 which is the sodium salt of an alkyl aryl polyether sulfonate, the Du Ponts and other anionic, cationic and nonionic emulsifiers may be used to advantage in emulsifying the hydroxypolyethers with water preparatory to mixing and reacting the hydroxypolyethers with organic diisocyanates to form foams. The amounts of wetting agents may vary from traces, e.g. 0.01 percent by weight based upon the mixtures up to 5 to 10 percent by weight upon a like basis.

For purposes of demonstrating the superior chemical and solvent resistance of coatings comprising a polyurethane resin derived by reaction of a hydroxypolyether resin and an organic diisocyanate, films of said resins were compared with those of a polyurethane resin derived by reacting the same diisocyanate with a commercial polyester mixture of recognized merit. The tests were conducted as follows:

EXAMPLE XI

The test panels employed were of plain, unprimed sheet steel. The polyester component employed in coating the control panels comprised:

Polyester 1

| | Moles |
|---|---|
| Phthalic anhydride_____ | 2.5 |
| Adipic acid_____ | 12.5 |
| Butanediol-1,3 _____ | 9.0 |
| Trimethylol ethane_____ | 12.0 |

The mixture is esterified to a hydroxyl number of 260–270 when diluted to 75 percent by weight of solids in Cellosolve [1] acetate.

Polyester 2

| | Moles |
|---|---|
| Adipic acid_____ | 3 |
| Glycerine _____ | 1 |
| Butanediol-1,3 _____ | 3.6 |

The mixture is esterified to a hydroxyl number of 135, when diluted with Cellosolve acetate to a 75 percent solids concentration.

These two polyesters are then made up into a mixture of (component A) suitable for reaction with an organic diisocyanate (component B) and comprising:

Component A

| | Parts by weight |
|---|---|
| Polyester 1_____ | 307.5 |
| Polyester 2_____ | 307.5 |

The polyester mixture, as free as practicable of water, as component A is made up with component B compris- ---
[1] Cellosolve acetate is a trade name for ethylene glycol monoethyl ether acetate.

ing prepolymers (Mondur C) and comprising a polyol and a mixture of 2,4- and 2,6-tolylene diisocyanate isomers. The proportions are:

| | Percent by weight |
|---|---|
| Polyester | 55 |
| Prepolymer | 45 |

The mixture is spread on steel test panels and cured.

In similar manner hydroxypolyethers of the following compositions are prepared:

*Polyether 1*

| | Parts by weight |
|---|---|
| Polypropylene glycol (molecular weight about 1025) | 512 |
| Butanediol-1,2 | 90 |
| Hexanetriol-1,2,6 | 134 |
| Dichloromethyl-xylenes (mixed) | 406 |

These are reacted by the techniques employed in preparing alkyd resins to a viscosity of $Z_5$ and a hydroxyl number of 121.

A second polyether (polyether 2) is prepared in similar manner and comprising:

*Polyether 2*

| | Parts by weight |
|---|---|
| 1,2,6-hexanetriol | 268 |
| 1,4-butanediol | 270 |
| Polypropylene glycol (molecular weight 1025) | 153 |
| Dichloromethyl xylenes | 900 |

The caustic is added and the composition is reacted to a hydroxyl value of 186 and a viscosity of $Z_6$.

These polyethers are quite viscous; to thin the same to a more satisfactory working viscosity, they may be mixed with a volatile, non-reactive solvent such as Cellosolve acetate (or mixtures of the same with aromatics such as toluene).

Polyether 1 is satisfactory at 50 percent by weight of solids; polyether 2 is satisfactory at a concentration of 75 percent by weight of solids.

A substantially water-free mixture of the two solutions is prepared comprising:

| | Parts by weight |
|---|---|
| Solution of polyether 1 | 142.5 |
| Solution of polyether 2 | 15.0 |

The solution has a hydroxyl number very nearly corresponding to that of the polyester mixture just described in this example.

Steel test panels are then coated with two systems and are cured at room temperatures.

The films are exposed to tests to determine their relative characteristics such as appearance, mar resistance, Sward hardness, caustic resistance, hydrochloric acid resistance, ethyl acetate resistance, sulfuric acid resistance, nitric acid resistance, acetone resistance, Cellosolve acetate resistance and acetone resistance. The results of these tests are tabulated as follows:

| Test | Polyester + Prepolymer (Mondur C) | Polyether + Prepolymer (Mondur C) |
|---|---|---|
| Appearance | OK | OK |
| Mar resistance | OK | OK |
| Sward hardness | 26 | 36 |
| NaOH, 25 percent 20 hrs | Sl. mark | OK |
| Acetic acid, 10 percent 20 hrs | Blister | OK |
| H₂SO₄, 10 percent 20 hrs | OK | OK |
| HNO₃, 10 percent 20 hrs | Raised | OK |
| Acetone | Raised | OK |
| Cellosolve acetate | Raised | OK |

It will be observed that in the tests, the samples coated with the interpolymers of the hydroxypolyethers and the prepolymers successfully withstood the various tests, including chemical resistance and solvent resistance. The polymers of the polyesters and the prepolymers of the tolylene diisocyanate isomers, on the other hand, under like conditions tended to raise from the metal.

The films on the panel coated with the interpolymers comprising the polyethers were also substantially harder than the corresponding films comprising the polyethers as the hydroxyl containing component.

In preparing the interpolymers of the polyethers of this invention and diisocyanates, the appropriate ratio of diisocyanate groups to hydroxyls can be determined by dividing 56,100 by the hydroxyl number of the polyether. Thus, suppose the hydroxyl number is 135, $$\frac{56,100}{135} = 415$$

=amount of polyether in grams equivalent to one gram equivalent of $-N=C=O$ as supplied by the isocyanate component of the reaction mixture. Obviously, if a volatile diisocyanate such as tolylene diisocyanate is employed to react with the polyethers of this application, it may be desirable to add an excess of the diisocyanate component in order to compensate for such losses.

It is to be understood that the forms of the invention as herein given are by way of illustration. Numerous modifications may be made therein without departing from the spirit of the invention or the scope of the appended claims.

We claim:

1. The method of forming a hydroxypolyether which comprises reacting in the presence of an alkaline material selected from the class consisting of alkali metal hydroxides and carbonates of alkali metal:
   (I) one mole of a dihalomethyl substituted benzene selected from the class consisting of dihalomethyl xylene and dihalomethyl mesitylene, with
   (II) a mixture of alcohol components,
      (A) one of which is a saturated trihydric alcohol,
      (B) another of which is a polyalkylene glycol selected from the class consisting of polyethylene glycol, polypropylene glycol and polybutylene glycol, and
      (C) a third of which is a glycol selected from the class consisting of 1,4-butanediol, 1,2-butanediol and pentenediol,
      the sums of said alcohols being in a range of 1 to 8 moles, there being at least 0.25 mole of each alcohol,
      reaction being continued until a hydroxyl number in a range of about 54.4 to about 1030 is obtained.

2. The method of forming a hydroxypolyether which comprises reacting in the presence of an alkaline material selected from the class consisting of alkali metal hydroxides and carbonates of alkali metal:
   (I) one mole of dihalomethyl substituted xylene with
   (II) a mixture of alcohol components,
      (A) one of which is selected from the class consisting of glycerine, pentaerythritol, 1,2,6-hexanetriol and trimethylolpropane,
      (B) a second of which is polypropylene glycol, and
      (C) a third of which is a glycol containing not more than 5 carbon atoms,
      the sums of said alcohols being in a range of 1 to 8 moles and there being at least about 0.25 mole of each alcohol,
      reaction being continued until a hydroxyl number in a range of about 54.4 to about 1030 is obtained.

3. A method of forming a hydroxypolyether which comprises reacting in the presence of an alkaline material selected from the class consisting of alkali metal hydroxides and carbonates of alkali metal:
   (I) one mole of dichloromethyl xylene with
   (II) a mixture of alcohols comprising:
      (A) 1,2,6-hexanetriol,
      (B) 1,4-butanediol, and
      (C) polypropylene glycol, the sums of said alcohols being equivalent to 1 to 8 moles per mole of the dichloromethyl xylene and there being at least 0.25 mole of each alcohol, reaction being continued until a hydroxyl number of about 54.4 to about 1030 is obtained.

References Cited in the file of this patent

UNITED STATES PATENTS

| | | |
|---|---|---|
| 2,654,732 | Geiser | Oct. 6, 1953 |
| 2,692,873 | Langerak et al. | Oct. 26, 1954 |
| 2,726,219 | Hill | Dec. 6, 1955 |
| 2,814,606 | Stilmar | Nov. 26, 1957 |
| 2,836,626 | Hatlelid | May 27, 1958 |
| 2,843,568 | Benning et al. | July 15, 1958 |
| 2,873,299 | Mikeska | Feb. 10, 1959 |
| 2,881,150 | Jaruzelski | Apr. 7, 1959 |

OTHER REFERENCES

Heiss et al.: Ind. and Eng. Chem., vol. 46, No. 7, July 1954, pp. 1498–1503.

UNITED STATES PATENT OFFICE
CERTIFICATE OF CORRECTION

Patent No. 3,088,922　　　　　　　　　　　　　　　May 7, 1963

Roger M. Christenson et al.

It is hereby certified that error appears in the above numbered patent requiring correction and that the said Letters Patent should read as corrected below.

Column 2, line 26, for "-O-CH" read -- -O-CH$_3$ --; column 5, line 51, for "iscosity" read -- Viscosity --; column 9, line 38, for "1,2,5-hexanetriol" read -- 1,2,6-hexanetriol --.

Signed and sealed this 3rd day of November 1964.

(SEAL)
Attest:

ERNEST W. SWIDER
Attesting Officer

EDWARD J. BRENNER
Commissioner of Patents